Figure 1:
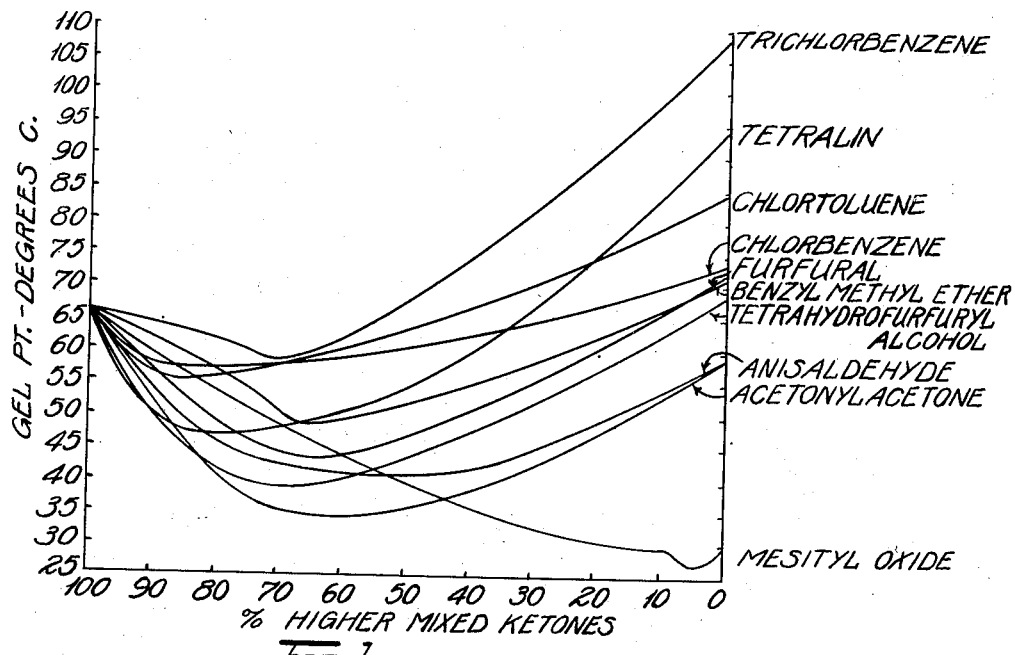

Feb. 17, 1942.    R. F. WOLF    2,273,682
POLYVINYL CHLORIDE SOLUTION AND METHOD OF MAKING THE SAME
Filed March 2, 1939

Inventor
Ralph F. Wolf
By Willis J. Avery
Atty

Patented Feb. 17, 1942

2,273,682

UNITED STATES PATENT OFFICE 2,273,682

POLYVINYL CHLORIDE SOLUTION AND METHOD OF MAKING THE SAME

Ralph F. Wolf, Cuyahoga Falls, Ohio, assignor to The B. F. Goodrich Company, New York, N. Y., a corporation of New York Application March 2, 1939, Serial No. 259,339

4 Claims. (Cl. 260—32)

This invention relates to solutions of polyvinyl chlorides, and to a method of making the same.

It is well known that by varying the conditions under which the polymerization of vinyl chloride is effected, polymers of varying solubilities are produced. Thus the alpha polymer is soluble in acetone, chloroform, nitro-benzene, chlorbenzene, acetophenone, aniline, ethyl benzoate, etc., the beta polymer is soluble in all of the aforementioned solvents except acetone and chloroform, while the gamma polymer is virtually insoluble in all these solvents at room temperature.

The gamma polymer of vinyl chloride is an exceedingly valuable material because of its property of forming resilient, rubber-like gels wtih plasticizers. Considerable difficulty has been experienced, however, in attempting to deposit gamma polyvinyl chloride, either in a plasticized or an unplasticized form, from solution because of the relatively high gel points of the solutions. Thus the gel point of a 10% solution of gamma polyvinyl chloride in chlorbenzene is 73° C., in chlortoluene is 84° C., and in furfural is 72° C. Gamma polyvinyl chloride must accordingly, be deposited from solutions at a high temperature. Not only does this increase the expense of the process, but polyvinyl chloride is not perfectly heat-stable and has a tendency to split off hydrogen chloride at elevated temperatures.

It is an object of this invention to provide a method of making gamma polyvinyl chloride solutions having relatively low gel points.

It is another object of this invention to provide improved solvents for gamma polyvinyl chloride.

Other objects will be apparent from the following description of the invention.

I have discovered that the incorporation of a saturated aliphatic ketone containing between four and seven carbon atoms in another compatible solvent for gamma polyvinyl chloride which latter solvent has a boiling point between about 56° and about 247° C. lowers the gel point of the solution below the gel points exhibited by solutions of the gamma polymer in either the solvent or the ketone alone.

Although 2-butanone may be employed if desired, its low boiling point renders it less useful than the higher ketones. Mixed higher ketones, a commercially-available solvent consisting approximately of ethyl isopropyl ketone 30% and di-isopropyl ketone 70% and having a boiling point of about 119° C. is an excellent solvent for lowering the gel point. Acetonylacetone (2,5-hexanedione) is another preferred compound within the scope of this invention.

The invention may be better understood by referring to the accompanying drawing in which Fig. 1 represents the gel points of 10% gamma polyvinyl chloride solutions in mixtures of higher mixed ketones and various solvents.

Figure 2:
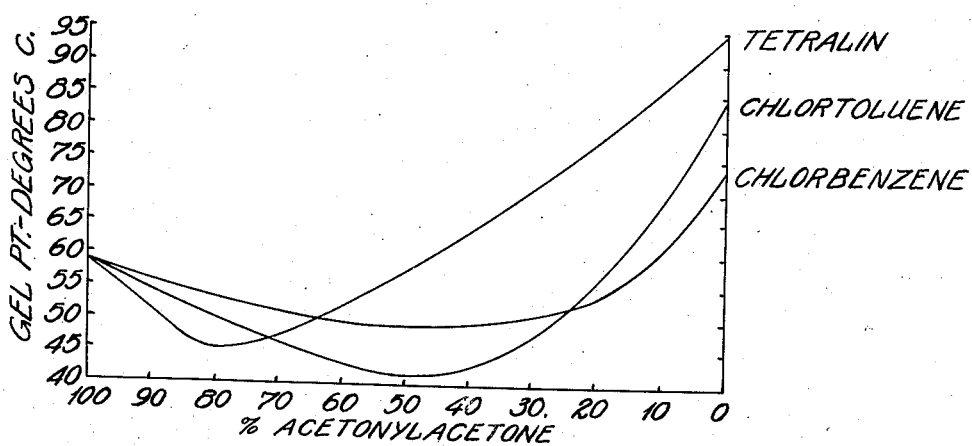

Fig. 2 represents the gel points of 10% gamma polyvinyl chloride solutions in mixtures of acetonylacetone and various solvents.

The gel points were obtained by dissolving 10 parts by weight of gamma polyvinyl chloride in 90 parts by weight of solvent by heating the components in a beaker in an oil bath. The solution was cooled with constant stirring until it gelled and would no longer flow from the bulb of the thermometer.

It can be seen by reference to Fig. 1 that the proportions of higher mixed ketones used depends on the gel point of solutions made with the other solvent alone. Thus with mesityl oxide, in which a 10% solution of gamma polyvinyl chloride has a gel point of 29, the higher mixed ketones are incorporated in proportions up to about 10%; with anisaldehyde, up to about 95%; and with acetonylacetone up to about 95%. When the other solvent produces solutions having a higher gel point than higher mixed ketone solutions, the higher mixed ketone is not ordinarily incorporated in small percentages, but may be used in large proportions. Thus with tetrahydrofurfuryl alcohol, the higher mixed ketones may be used in proportions from about 5% to 100%; with benzyl methyl ether from about 10% to 100%; with chlorbenzene from about 40% to 100%; with tetralin from about 30% to 100%; and with trichlorbenzene from about 50% to 100%.

The same general principles apply to the use of acetonylacetone as can be seen from Fig. 2 or, indeed, any of the saturated aliphatic ketones containing between 4 and 7 carbon atoms. Thus when the other solvent produces 10% solutions with gel points lower than 58, the gel point of a 10% acetonylacetone solution of gamma polyvinyl chloride, the acetonylacetone may be profitably used in proportions from 0% through the range having a depressed gel point and up to the proportion at which the gel point is again that of the other solvent. When the other solvent produces 10% solutions with gel points higher than 58, the acetonylacetone may be profitably used in proportions from 100% down to the proportion at which the gel point reached 58.

The most useful proportion of ketone and other solvent will naturally vary in every case, but in experiments with many different solvents it has been found that in every case a range of depressed gel points existed, the depression starting at 100% ketone or 0% ketone depending upon the gel points exhibited by solutions with the other solvent as has heretofore been explained.

The term "a saturated aliphatic ketone" as used in the appended claims includes mixtures of ketones as well as single compounds.

It is to be understood that this invention is applicable to gamma polyvinyl chloride in a plasticized or unplasticized state, and that the terms "gamma polyvinyl chloride" is used in the claims to include plasticized compositions.

The term "another compatible solvent" as used in the claims refers to the fact that for the successful operation of this invention, the ketonic solvent and the other solvent must be mutually soluble in the proportions in which it is desired to mix them.

Although I have herein disclosed specific embodiments of my invention, I do not intend to limit myself solely thereto, for it will be obvious that many modifications thereof are within the spirit and scope of the invention as defined in the appended claims.

I claim:

1. The method of making a solution of gamma polyvinyl chloride having a lower gel point than a solution in either solvent alone, which comprises dissolving gamma polyvinyl chloride in a mixed solvent containing a saturated aliphatic ketone containing between 4 and 7 carbon atoms and another compatible solvent having a boiling point between about 56° and about 247° C.

2. A solution of gamma polyvinyl chloride in a mixed solvent containing a saturated aliphatic ketone containing between 4 and 7 carbon atoms and another compatible solvent having a boiling point between about 56° and about 247° C., which solution has a lower gel point than a similar solution in either solvent alone.

3. A solution of gamma polyvinyl chloride in a mixed solvent containing acetonylacetone and another compatible solvent having a boiling point between about 56° and about 247° C., which solution has a lower gel point than a similar solution in either solvent alone.

4. A solution of gamma polyvinyl chloride in a mixed solvent containing a mixture of ethyl isopropyl ketone and di-isopropyl ketone and another compatible solvent having a boiling point between about 56° and about 247° C., which solution has a lower gel point than a similar solution in either solvent alone.

RALPH F. WOLF.